3,156,091
MULTI-LAYER ANISOTROPIC HEAT SHIELD CONSTRUCTION
George Kraus, Jackson Heights, N.Y., assignor to Curtiss-Wright Corporation, a corporation of Delaware
Filed July 19, 1961, Ser. No. 125,253
17 Claims. (Cl. 60—35.6)

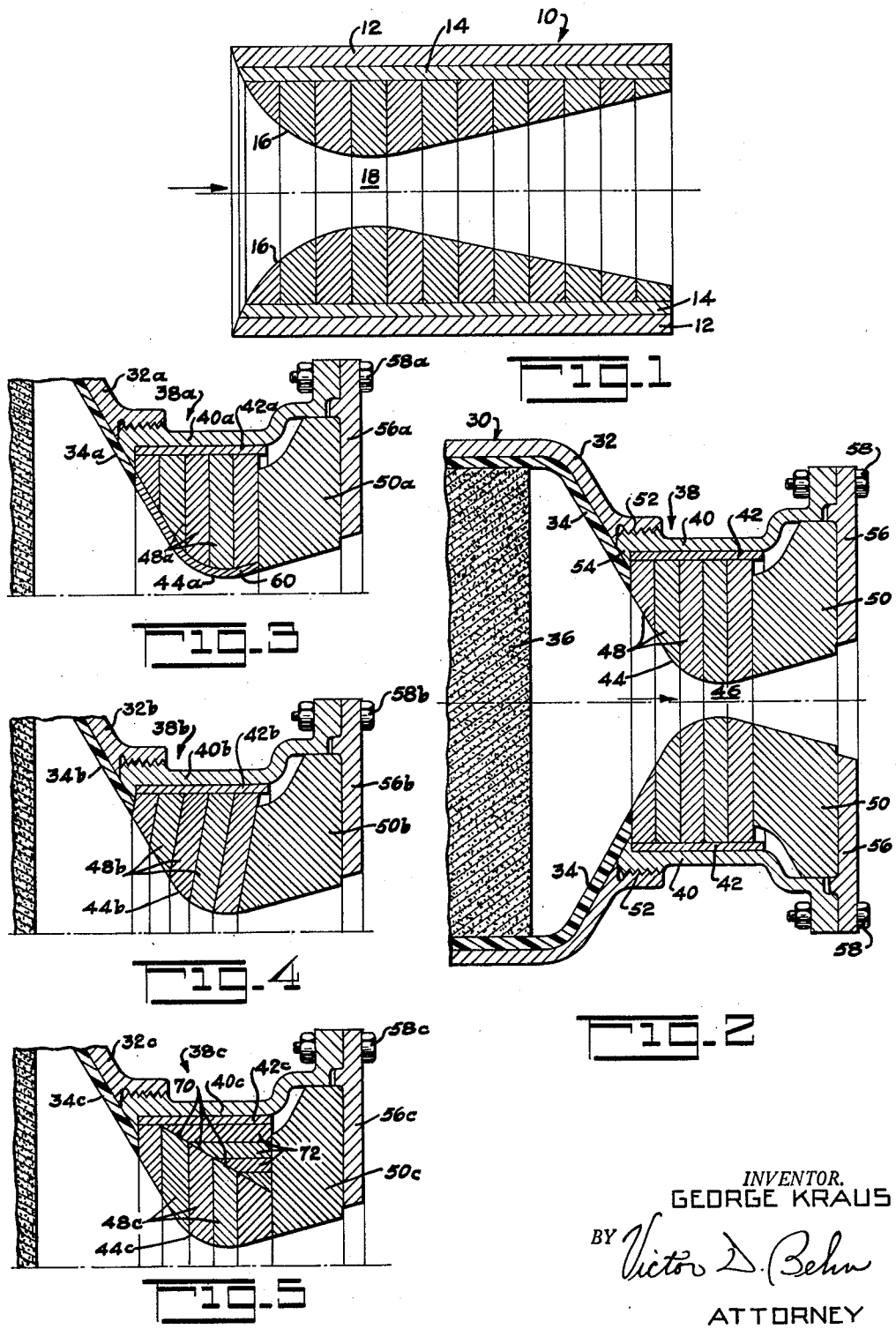

The invention relates to heat shield structures and is particularly directed to anisotropic multi-layer heat shield structures.

The invention is herein described in connection with the exhaust nozzles of a jet engine but as will be apparent the invention is not so limited.

As used herein the term "jet engine" is intended to be sufficiently broad in meaning to cover air breathing engines for example turbojets, ramjets, etc., as well as non-air-breathing engines such as rockets.

In the case of rockets and other jet engines using liquid propellants it is a common expedient to use an engine propellant as a coolant for the discharge nozzle for the engine exhaust gases. In the case of solid propellant rockets, however, the propellants are not readily suitable for use as a nozzle coolant. Accordingly the invention is particularly applicable to solid fuel rockets and is herein described in connection with such rockets. As will be apparent, however, the invention is also applicable to the exhaust nozzles of other types of jet engines.

In order to obtain higher thrusts from rocket engine propellants which burn at higher temperatures for example higher than 5500° F. are being considered. Thus an article on Pyrolytic Graphite, appearing on pages 67–72 of the February 13, 1961 issue of Aviation Week, indicates that rocket propellants having combustion gas temperatures in excess of 6000° F. are being considered for the Polaris missile. The use of propellants burning at higher temperatures obviously results in the rocket nozzles being subjected to higher temperatures, thereby increasing the erosive action of the exhaust gas flow on the rocket nozzle. The erosive action on the rocket nozzle of the exhaust gas flow therethrough also depends on the magnitude of the rocket combustion pressure. The design of a rocket nozzle capable of operating for a sufficient period of time with such modern high temperature rocket propellants is a serious problem today. The prime object of the present invention resides in the provision of a novel and simple nozzle design in which the nozzle is capable of operating at such high temperatures without the provision of special means for cooling the nozzle.

As mentioned in said Aviation Week article pyrolytic graphite, because of its high heat insulating properties at high temperatures has already been proposed as a heat insulating layer for rocket nozzles.

Pyrolytic graphite is a known form of graphite which is produced in a furnace by a high temperature pyrolysis or decomposition of carbon containing vapors such as a methane-hydrogen mixture, the pyrolytic graphite being deposited on a substrate layer which usually is a conventional graphite. Pyrolytic graphite has a stratified or laminar structure, the individual layers generally even being visible to the eye. The laminar structure of pyrolytic graphite results in this form of graphite having marked anisotropic properties. Thus pyrolytic graphite is an excellent heat conductor in a direction parallel to its layers and is an excellent heat insulator or non-heat conductor in a direction at right angles thereto across its layers. These heat conduction characteristics of pyrolytic graphite are particularly significant at high temperatures because of the high temperatures properties of graphite. In addition the heat insulating property of pyrolytic graphite acutally increases with increase in temperature.

Various substances may be alloyed or compounded with the pyrolytic graphite by co-deposition with the graphite. The alloying substance preferably is first vaporized and is separately supplied into the furnace containing the carbon bearing vapors. For example, boron chloride vapor may be fed into the furnace whereupon the boron co-deposits with the graphite and may form boron carbide. Such alloys or compounds with pyrolytic graphite all also herein termed pyrolytic graphite.

It has also been previously proposed by others to build up a rocket nozzle in a plurality of layers consisting of an outer load carrying layer, an intermediate heat insulating layer and an inner heat conducting layer. It has been further proposed to add a fourth refractory layer over the inner surface of said third layer.

It is a further object of the present invention to provide a novel multi-layer rocket nozzle in which at least certain of the layers have marked anisotropic properties.

A further object of the invention comprises the provision of a multi-layer nozzle utilizing two layers of pyrolytic graphite in a unique manner so as to take advantage of its anistropic properties both as to its strength and heat conduction properties.

The rocket nozzle of the invention comprises a load carrying layer, a first layer of pyrolytic graphite covering the inner surface of the load carrying layer and a second layer of pyrolytic graphite covering the inner surface of the first pyrolytic graphite layer, said first graphite layer being oriented to function as a heat shield or insulator for the load carrying layer and the second pyrolytic graphite layer being oriented to function as a relatively good heat conductor in a direction from its inner surface toward it outer surface. This arrangement greatly reduces the erosion of the nozzle by the hot exhaust gases because the heat conducting properties of said inner or second pyrolytic graphite layer reduces the temperature of the nozzle inner surface and in addition because this second pyrolytic graphite layer is oriented in its optimum manner, with respect to its physical properties, against erosion by the exhaust gases.

In the case of a jet engine nozzle the multi-layer anisotropic heat exchange structure of the invention is used to protect the load carrying structure of the nozzle from the heat within the nozzle of the nozzle exhaust gases.

A similar problem exists in the case of aircraft which travel through the atmosphere at high speeds. As used herein the term "aircraft" is intended to broadly cover aircraft, missiles, space vehicles, atmosphere reentry vehicles and other objects intended to travel through an atmosphere and/or space. With this definition an exhaust nozzle for an aircraft jet engine may be termed an aircraft part.

As is known when an aircraft travels through the atmosphere at speeds in excess of Mach No. 1 the external surfaces of the aircraft become quite hot. This is particularly true of the leading edges of parts of the aircraft. Accordingly, the load carrying structure of a high speed aircraft must be insulated from its high surface temperatures. The novel anisotropic multi-layer arrangement of the present invention obviously may also be used for this purpose particularly where the part is exposed to high temperatures for a limited period of time.

Accordingly, another object of the invention resides in the provision of a novel multi-layer arrangement for an aircraft part having a surface exposed to high temperatures whereby the load carrying layer of said part is protected against the high temperatures of its exposed surface.

Other objects of the invention will become apparent upon reading the annexed detailed description in connection with the drawing in which:

FIG. 1 is a schematic axial sectional view of a nozzle embodying the invention;

FIG. 2 is an axial sectional view of the rear end of a solid fuel rocket having a nozzle embodying the invention;

FIG. 3 is a view similar to the nozzle portion of FIG. 2 but illustrating a modification of the invention; and FIGS. 4 and 5 are views similar to FIG. 3 but illustrating further modifications.

Referring first to FIG. 1 an exhaust gas nozzle 10, for example for a rocket, is illustrated as having a multi-layer construction comprising an outer annular layer 12, an intermediate annular layer 14 and an inner annular layer 16. The outer layer 12 constitutes the load carrying member of the nozzle and may be made of a suitable steel. The intermediate layer 14 forms a lining over the inner surface of the outer layer and is made of a material such that the intermediate layer acts as a heat shield to heat insulate the outer load carrying structure 12. The inner layer 16 forms a lining over the inner surface of the heat shield 14 and is made of a material which is a good heat conductor in a direction radially outwardly (relative to the nozzle axis) away from its inner surface whereby said inner layer functions as a heat sink.

The inner surface of the inner nozzle layer forms the nozzle flow path for the rocket exhaust gases, said gases flowing in the direction indicated by the arrow on FIG. 1 and said flow path having the usual convergent-divergent profile with a throat portion 18.

The material of the intermediate layer 14 preferable is a pyrolytic graphite. As already stated pyrolytic graphite has a laminar structure and it has very pronounced anisotropy with respect to its property of heat conduction. In a direction parallel to its laminar layers pyrolytic graphite is an excellent heat conductor whereas in a direction perpendicular to its layers pyrolytic graphite is an excellent heat insulator. The pyrolytic graphite material of the intermediate layer is oriented so that it is a poor heat conductor in a radial direction relative to the nozzle axis, that is from its inner surface to its outer surface, whereby this intermediate layer functions as a heat shield for the load carrying layer 12 to protect said load carrying layer from the heat of the hot exhaust gases.

The material of this inner layer 16 also is anisotropic and preferably also is a pyrolytic graphite material. This pyrolytic graphite material of the inner layer, however, is oriented so that it is a good heat conductor in a radial direction, that is from its iner surface to its outer surface, whereby this inner layer functions as a heat sink for the heat entering its inner surface from the exhaust gases.

As stated, pyrolytic graphite is obtained in a furnace by vapor deposition from a carbon bearing vapor. The deposit can be built up to a sufficient thickness so that it can be separated from the substrate or base material on which it was deposited. At present pyrolytic graphite is available only to a limited thickness of about ½ inch. The material, however, can be made to various shapes by depositing it on a substrate of the desired shape. Furthermore the material can be cut with suitable carbide cutting wheels. Because pyrolytic graphite is available in layers of only limited thickness the inner nozzle layer 16 must be built up as illustrated from a plurality of annular ring-shaped slabs 20 which are co-axially disposed in side-by-side relation and are suitably bonded or mechanically held together in the nozzle 10. When pyrolytic graphite of substantially greater thickness is available the inner layer 16 may have a one piece construction.

In FIG. 1 the layers or strata of the pyrolytic graphite slabs 20 are substantially radial. This means that the pyrolytic graphite slabs 20 are oriented for maximum resistance to erosion by the exhaust gas flow through the nozzle. In addition, when so oriented the heat conductivity of the pyrolytic graphite slabs 20 is a maximum in a radial direction whereby heat is rapidly conducted away from the inner surface of the nozzle thereby minimizing the temperature of this surface. This decrease in the temperature of the nozzle inner surface further improves its resistance to erosion by the nozzle gas flow.

Because of the high heat conducting properties in a radial direction the inner pyrolytic layer 16 rapidly conducts heat away from its inner surface and because the intermediate layer 14 is a heat insulator in a radial direction, the inner layer 16 functions as a heat sink. As a result the inner surface of the heat insulating layer 14 becomes quite hot. In the case of a high temperature rocket nozzle the temperature of the inner surface of the intermediate layer 14 could exceed the maximum allowable temperature of other insulators. Because the pyrolytic graphite layer 14 is not directly exposed to the erosive action of the exhaust gas flow its maximum allowable temperature can be as high as its decomposition temperature which is well over 6000° F. Furthermore because of its excellent heat insulating properties the intermediate layer 14 need only be of minimum radial thickness and weight to heat insulate the outer layer or load carrying structure 12. The inner layer 16, however, preferably has substantially greater radial thickness in order that this inner layer has adequate heat sink capacity so as to minimize the temperature of its inner surface during nozzle operation. This is particularly true in the vicinity of the nozzle throat where the heat transfer to the nozzle from the exhaust gases is a maximum.

FIG. 2 illustrates an application of such a nozzle to a solid fuel rocket. As shown in FIG. 2 a rocket 30 comprises a casing 32 having a suitable heat insulating liner 34 which may be glass or asbestos fiber reinforced high-temperature phenolic resin. The rocket 30 has a solid fuel charge 36 and an exhaust nozzle 38 at its rear end for discharge flow of the combustion gases therethrough.

The nozzle 38 of FIG. 2 is similar to the nozzle diagrammatically illustrated in FIG. 1 in that it has a multi-layer construction. Thus as shown the nozzle 38 has a load carrying outer layer or structure 40, an intermediate layer 42 and an inner layer 44 providing the nozzle with its exhaust gas flow path having a convergent-divergent profile and throat region 46. The intermediate nozzle layer 42 and the inner layer 44 are made of pyrolytic graphite material at least at the upstream end of the nozzle.

The temperature of the exhaust gases flowing through the nozzle decreases as the gas flows through the nozzle. Hence the high temperature requirements of the nozzle are not as severe at the downstream end of the nozzle and therefore, as illustrated in FIG. 2 it may not be necessary for the pyrolytic graphite intermediate and inner layers of the nozzle to extend the full length of the nozzle.

The intermediate layer 42 is made of a pyrolytic graphite material which is oriented to provide maximum heat insulation in a radial direction relative to the nozzle axis. The upstream end of the inner layer 44 is also made of pyrolytic graphite material which as in FIG. 1 comprises a plurality of co-axial and side-by-side annular slabs or rings 48 of said material.

At the downstream end the inner portion of the nozzle may be formed by a graphite block 50 of conventional relatively non-anisotropic but high grade graphite such as has been used for high temperature work. Obviously, however, if required to adequately resist the erosive action of the exhaust gas flow through the nozzle and to adequately heat insulate the outer supporting structure 40, the pyrolytic intermediate layer may be co-extensive with the length of the nozzle and the pyrolytic rings 48 may form the entire inner surface of the nozzle as in FIG. 1.

The outer layer or structure 40 of the nozzle 38 has a suitable connection such as a threaded connection 52 with the rocket casing 32. In addition said outer layer 40 has an inturned annular flange 54 at its rocket casing end and a retainer ring 56 is attached by bolts 58 to its other end so that the pyrolytic graphite rings 48 and annular graphite block 50, as well as the intermediate layer, are all held in position between the flange 54 and retainer ring 56.

If desired, the rings 48 and graphite block 50 may be bonded together by a suitable cement in order to prevent the hot exhaust gases from finding their way between these nozzle rings. In addition, or in lieu of such cement, a liner of suitable flame resistant refractory material, such as tungsten or molybdenum, may be formed over the inner surfaces of said rings as by spraying or, for example, by means of a preformed liner. Such a modification is illustrated in FIG. 3 in which said flame resistant heat refractory layer is indicated at 60. The remaining parts of FIG. 3 have been designated by the same reference numerals as the corresponding parts of FIG. 2 but with a subscript $a$ added thereto. Hence no further description of FIG. 3 appears to be necessary.

The capacity of the heat sink provided by the rings 48 depends on their radial dimension, that is on the length of the heat flow path in their maximum heat conduction direction. Accordingly, the heat sink capacity may be increased by providing the pyrolytic graphite rings of the inner layer with a frusto-conical shape with an aperture therein. Such a modification is shown in FIG. 4.

Except for the frusto-conical shape of the pyrolytic graphite rings of the inner nozzle layer in FIG. 4 as contrasted with the flat rings in FIG. 2, the structure of FIG. 4 is otherwise like that of FIG. 2. For ease of understanding the parts of FIG. 4 have been designated by the same reference numerals as the corresponding parts of FIG. 2 but with a subscript $b$ added thereto. The frusto-conical rings 48b may be slanted in either direction. No further description of FIG. 4 appears necessary.

The length of the heat flow path of at least a portion of the inner pyrolytic graphite layer may also be increased in the manner illustrated in FIG. 5 by providing at least certain of its rings with an L-shaped cross-section. Again, for ease of understanding, the parts of FIG. 5 have been designated by the same reference numerals as the corresponding parts of FIG. 2 but with a subscript $c$ added thereto.

In FIG. 5 each pyrolytic graphite ring 48c has the shape of a frustum of a cone with an aperture therein with an inclined face 70 at its radially outer end and a pyrolytic graphite ring 72 has a mating inclined face and extends in an axial direction from the face 70. Each pyrolytic graphite ring 72 has its layers oriented so that it has its maximum heat conducting properties in a direction axial of the nozzle. As illustrated, the inclined faces 70 preferably lie in a common inclined surface and the rings 72 all extend in the same axial direction upstream from this surface. Each pair of rings 48c and 72 may if desired be made in one piece.

With this structure of FIG. 5, the heat which enters a ring 48c, having inclined face 70, first flows radially through the ring to its inclined face 70 and then enters the mating ring 72 and flows axial along the latter ring. As illustrated, the most upstream ring 48c having an inclined face 70 in combination with its associated ring 72 provides a good heat conducting flow path which is much longer than that provided by the corresponding ring 48a in FIG. 2. The rings 48c with the inclined faces 70 are disposed so that a relatively long heat flow path is provided where it is needed most, that is at the nozzle throat and immediately upstream therefrom.

FIG. 5 is otherwise like FIG. 2 and therefore no further description of FIG. 5 is necessary.

FIG. 2 illustrates a rocket nozzle construction having a specific mode of attachment of the nozzle to the rocket casing and a specific structure for holding the inner nozzle layers in position on the outer load carrying layer. These specific details, however, form no part of the present invention. Furthermore, although the invention is illustrated in connection with a nozzle which is fixed with respect to its rocket casing it is obvious that the invention is equally applicable to rocket and other jet engine nozzles in which the nozzle is adjustable to vary the orientation of its axis.

The invention has been illustrated and described in connection with a jet engine exhaust nozzle. In this connection the invention serves as a heat shield to protect the load carrying structure of the nozzle from the high temperatures existing at the inner surface or the exhaust gas flow path of the nozzle. As already indicated, the invention has other applications particularly where a part is exposed to high temperatures for a limited period of time. For example it may be used as a heat shield to protect the load carrying structure of other aircraft parts from the high temperatures which exist at the external surfaces (particularly the leading edges) of those parts exposed to supersonic flow of the surrounding atmosphere thereover.

In the case of an aircraft part, such as an exhaust nozzle, the high temperatures are on the inside of the nozzle and therefore the load carrying structure forms the outer layer of the multi-layer nozzle structure. However, in the case of a supersonic aircraft part exposed to flow of the surrounding atmosphere thereover the high temperatures exist on the external surface of the part and therefore in applying the invention to such an aircraft part the load carrying structure of the part is now made the inner layer. Similarly, although in the case of the jet engine nozzle the pyrolytic graphite heat sink layer (layer 16 in FIG. 1) forms the inner layer, in the case of an aircraft part having an external surface exposed to supersonic flow this heat sink layer would now be made an outer layer. In either application of the invention the pyrolytic graphite heat insulating layer (layer 14 in FIG. 1) would be an intermediate layer.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

What I claim is:

1. An exhaust gas nozzle construction for jet engines having an exhaust gas discharge nozzle the inner surface of which includes a throat portion and defines a flow passage for discharge of exhaust gases through said nozzle to provide thrust for said jet engine, said exhaust gas nozzle construction comprising an annular load carrying member; an annular first layer forming a lining over at least a portion of the inner surface of said load carrying member, said first layer being of a material for insulating said load carrying member against outward flow internal heat from within the nozzle; and an annular second layer disposed over at least a portion of the inner surface of said first layer, said second layer being of a material which is anisotropic in that it has relatively good heat conduction property in one direction and has relatively good heat insulation property in a direction substantially at right angles thereto, the anisotropic material of the second layer being oriented so that, at least at its inner surface, said second layer has relatively good heat conduction in a direction from its inner surface toward its outer surface and has relatively good heat insulation in a direction at right angles to its said good heat conduction direction.

2. A nozzle construction as claimed in claim 1 and in which the material of said second layer comprises pyrolytic graphite.

3. A nozzle construction as claimed in claim 2 and in which said second layer comprises a plurality of coaxial ring members.

4. A nozzle construction as claimed in claim 3 and including an inner layer of refractory material.

5. A nozzle construction as claimed in claim 3 and in which said ring members have a frusto-conical shape.

6. A nozzle construction as claimed in claim 1 and in which said nozzle has a convergent-divergent flow path for the exhaust gas flow therethrough and further in which at least in the vicinity of the nozzle throat the radial depth of said second layer is substantially greater than that of said first layer.

7. A nozzle construction as claimed in claim 1 and in which said nozzle has a convergent-divergent flow path for the exhaust gas flow therethrough and further in which, in the vicinity of the nozzle throat, the length of the relatively good heat conducting flow path of said anisotropic second layer, beginning at a point on its inner surface, is substantially greater than the radial dimension of the adjacent portion of said second layer.

8. A nozzle construction as claimed in claim 1 and in which the material of said first layer is also anisotropic but such that said first layer has relatively good heat insulating properties in a direction from its inner surface toward its outer surface and has relatively good heat conducting properties in a direction generally parallel to the direction of gas flow through the nozzle.

9. A nozzle construction as claimed in claim 8 in which the material of both said first and second layers comprise pyrolytic graphite.

10. A nozzle construction as claimed in claim 9 and in which said nozzle has a convergent-divergent flow path for the exhaust gas flow therethrough and further in which at least in the vicinity of the nozzle throat the radial depth of said second layer is substantially greater than that of said first layer.

11. A nozzle construction as claimed in claim 9 and in which said pyrolytic graphite second layer comprises a plurality of co-axial ring means.

12. A nozzle construction as claimed in claim 11 and in which said nozzle has a convergent-divergent flow path for the exhaust gas flow therethrough and in which at least some of the ring means of the pyrolytic graphite second layer disposed adjacent to the nozzle throat include a portion in which the direction of its relatively good heat conducting flow makes an angle with the radial direction.

13. A nozzle construction as claimed in claim 12 and in which said portion of a ring means of the pyrolytic graphite second layer disposed adjacent to the nozzle throat has its relatively good heat conducting flow direction directed axially.

14. An aircraft part having a surface exposed to gas flow thereover to subject said surface to high temperatures, said part having structural load-carrying means; a first layer of heat insulating material disposed over said load-carrying means; and a second layer disposed over said first layer and having its surface remote from said first layer exposed to said high temperatures; said second layer being made of a material which has anisotropic heat conduction properties in that it has relatively good heat conduction property in one direction and has relatively good heat insulation property in a direction substantially at right angles thereto, the material of said second layer being oriented so that, at least at its surface remote from said first layer, said second layer has relatively good heat conduction in a direction from said surface toward said first layer.

15. An aircraft part as claimed in claim 14 and in which the material of said second layer is pyrolytic graphite.

16. An aircraft part as claimed in claim 15 and in which the material of said first layer is also pyrolytic graphite oriented to provide good heat insulation between said second layer and said load carrying means.

17. An aircraft part as claimed in claim 16 in which the length of the heat conducting path provided by at least a portion of the second layer is greater than the thickness of said second layer adjacent to said portion.

References Cited by the Examiner
UNITED STATES PATENTS

| | | | |
|---|---|---|---|
| 2,392,682 | 1/46 | Marek | 117—46 |
| 2,644,296 | 7/53 | Sanz et al. | 60—35.6 |
| 2,789,038 | 4/57 | Bennett et al. | 60—35.6 |
| 2,856,820 | 10/58 | Schmued et al. | 60—35.6 |
| 2,958,184 | 11/60 | Sanders | 60—35.6 |

SAMUEL LEVINE, *Primary Examiner.*